L. L. & G. D. HAWORTH.
Hand Check-Row Planter.
No. 197,272.                    Patented Nov. 20, 1877.
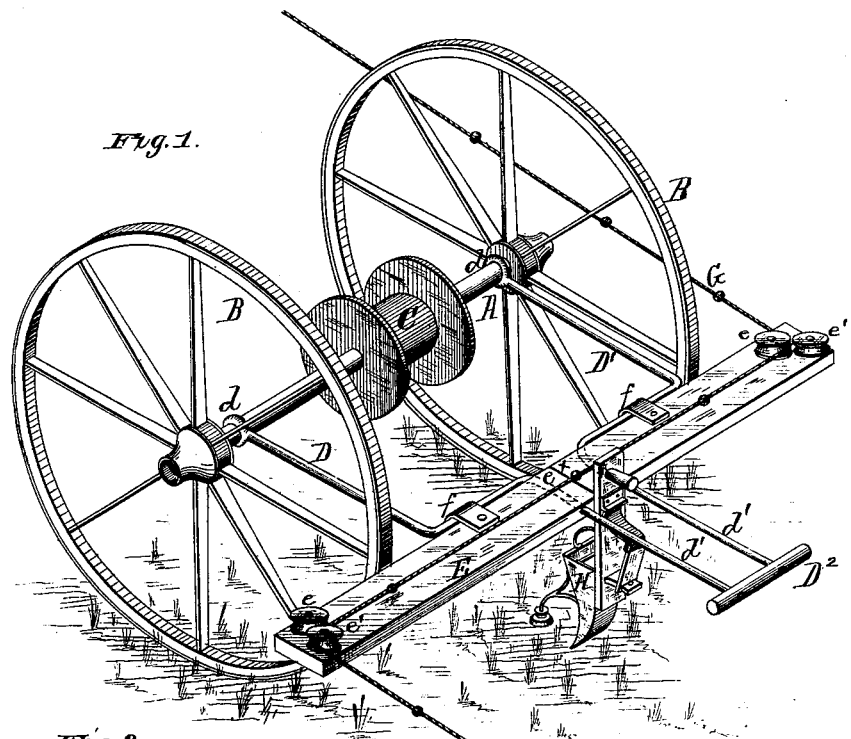
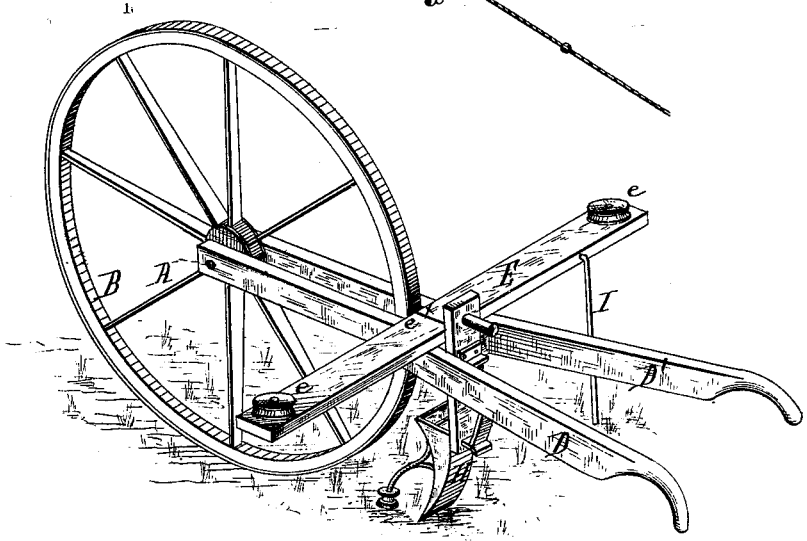
WITNESSES                                      INVENTORS.

UNITED STATES PATENT OFFICE.

LYSANDER L. HAWORTH AND GEORGE D. HAWORTH, OF DECATUR, ILL.

IMPROVEMENT IN HAND CHECK-ROW PLANTERS.

Specification forming part of Letters Patent No. 197,272, dated November 20, 1877; application filed September 22, 1877.

*To all whom it may concern:*

Be it known that we, LYSANDER L. HAWORTH and GEORGE D. HAWORTH, both of Decatur, county of Macon, State of Illinois, have invented certain new and useful Improvements in Combined Hand-Truck for Check-Row Cords or Markers and Hand Corn-Planters, of which the following is a full, clear, and exact description, reference being had to the accompanying drawings, making part of this specification, in which—

Figure 1 represents a perspective view of the improved check-row marker and hand-planter; and Fig. 2 is a similar view, showing a modification in the form of the marker-truck.

My invention relates to a novel construction of hand-truck, for use in connection with a check-row cord or marker, for laying and transferring the same, and to the manner of combining a hand-planter with said truck and check-row cord or marker, whereby the operator is enabled, in drawing or pushing the truck across the field, not only to take up, transfer, and relay the cord or marker in proper position to be acted on during the return or succeeding passage of the truck, but, at the same time, guided by the knots or marks on the check-row cord or marker, to also plant the hills of corn with precision by the aid of a hand-planter connected with and propelled by the marker-truck, as hereinafter explained.

In the accompanying drawings, A represents the axle of the marker-truck, and B B the carrying and supporting wheels, mounted thereon, preferably, where two are used, at a distance apart about equal to the distance between the rows of corn to be planted, in such manner that the tracks of the wheels in one round or passage across the field will serve as a guide in making the return or succeeding round.

One of the wheels B, by preference, is made fast upon the axle, so as to rotate the latter and give motion to a reel, C, upon which the check-row cord or marker is wound and carried when not in use. This reel is shown mounted directly upon the axle A; but it may be placed upon a secondary shaft, and operated either by hand, or from the axle, or one of the carrying-wheels, as preferred, for paying out the cord or for reeling in the same, as required.

D D$^1$ represent two frame-bars, provided at their inner ends $d$ with eyes or short sleeves, embracing and turning freely on the axle A, at points intermediate between, and, by preference, in close proximity to, the wheels, one on each side. These bars extend thence to a point outside the periphery of the wheels, and through or beyond a transverse pulley-bar, E, and are united at their outer ends by a handle-bar, D$^2$, by means of which the truck is propelled.

The truck, consisting of the frame D D, axle A, wheels B, and transferring-bar E, is designed to be pushed forward in advance of the operator, for enabling him to more easily see the position and operation of the parts hereinafter described, and has the bar E arranged transversely to the path of the wheels just in rear thereof, said bar being attached to the truck-frame bars by being perforated and slipped on the handle ends $d'$ of the bars D, and held in place by clamps $ff$; or it may be attached in any other convenient manner, as preferred.

The bar E is provided at its ends with grooved pulleys $e\ e'$, for changing the direction of and transferring the check-row cord or marker G from one side of the truck to the other, as shown.

H represents the hand-planter, which may be of any usual or preferred construction, said planter being rigidly attached, by any convenient means, to the transferring-bar E, by preference midway of its length, and directly in front of the operator; and the bar E, in line therewith, is provided with a mark at $e^x$, over which the knots or marks on the check-row cord pass, and which serves to indicate to the attendant when the hand-planter is to be operated.

The cord or marker G, when in use, is stretched across the field and held or anchored at its ends in any usual or preferred manner.

The operation is as follows: Supposing the check-row cord to be stretched and anchored at opposite sides of the field and properly placed over the transferring-pulleys $e\ e'\ e\ e'$, as shown, the operator, grasping the handle D$^2$, raises the latter, and with it the planter, until the latter is clear of or above the surface of the ground, when he proceeds to push the truck before him until one of the knots or marks on the check-row cord or wire crosses the mark or line $e^x$, when, by depressing the handle $D^2$, the hand-planter H is thrust into the ground, and is operated thereby and made to deposit the corn in the usual manner, after which, and without perceptible interruption, the attendant again raises the handle $D^2$ and pushes the machine forward, as before, until the passage of another knot or mark on the cord over the mark $e^x$ indicates that the operation of the planter is to be repeated, and so on to the end of the row, the truck at the same time taking up, transferring, and relaying the cord or marker in the proper position for the return or succeeding passage of the truck and planter across the field. The attachment of the transferring-bar E and of the planter H to the light vibrating draft or thrust frame, and the arrangement of the latter directly in front of the operator, as explained, greatly facilitates the labor of the latter, and is therefore preferred.

A modification in the form of the marker-truck is shown in Fig. 2, where a single wheel is employed, the truck assuming the form of a wheelbarrow. The vibrating frame-bars in this construction are secured to the axle on opposite sides of the single carrying-wheel, and the transferring-bar E is attached, as in Fig. 1, just outside the periphery of the wheel. In this construction, also, the handle ends of the frame-bars will, by preference, be made to diverge, or be otherwise sufficiently separated to enable the operator to walk between them, and thereby to better control and propel the truck.

When the single wheel is employed, the transferring-bar is provided with a pivoted foot-piece, I, which, in connection with the planter H, serves to uphold the frame when the truck is at rest, and which, when the truck is in use, can be turned over on the frame out of the way. Similar supporting-pieces may be used on the two-wheel truck, if desired; but the two wheels, in connection with the planter, are sufficient to uphold the frame, and they are not required.

The essential elements of the truck—viz., a carrying wheel or wheels, a vibrating frame, enabling the attendant to operate the hand-planter, the cord-transferring bar, the hand-planter, and the manner of propelling and operating the same—are substantially the same in both contructions, whether the truck be propelled in advance of or drawn after the operator.

Where the single wheel is employed, said wheel being in the same line or track with the hand-planter, it serves, when in advance of the planter, to level and pulverize the ground for the reception of the corn, and where the planter is placed in advance of the wheel, as it may be, if preferred, upon an extension of the vibrating frame-bars for that purpose, the wheel presses the soil down upon and thereby serves to more thoroughly cover the corn.

The marker devices—viz., the transferring-bar, with its pulleys, &c., together with the hand-planter—may, of course, be made separate and detachable from the truck, adapting the latter to be used for other purposes, and thereby saving the expense of a separate truck; or they may be adapted to be applied to any light hand-cart or wheelbarrow in use for other purposes. We therefore do not wish to be restricted to the particular construction and arrangement shown and described; but

What we claim as new, and desire to secure by Letters Patent, is—

1. A hand corn-planter attached to and adapted to be propelled and operated by a hand check-row cord or marker-truck.

2. In a hand marker-truck, a hand or walking planter attached to and adapted to be propelled and operated by means of the vibrating frame or frame-bar of said truck, in combination with guides or pulleys for the check-row cord or marker, substantially as described.

3. The combination of the hand marker-truck, the check-row cord or marker, and a hand-planter attached to and propelled by the truck, substantially as described.

LYSANDER L. HAWORTH.
GEO. D. HAWORTH.

Witnesses:
JAMES W. HAWORTH,
W. W. KERR.